United States Patent
Granado Macarrilla et al.

(10) Patent No.: US 9,016,615 B2
(45) Date of Patent: Apr. 28, 2015

(54) LIGHTNING AND CORROSION PROTECTION ARRANGEMENT IN AN AIRCRAFT STRUCTURAL COMPONENT

(75) Inventors: José Orencio Granado Macarrilla, Madrid (ES); Vincente Martínez Valdegrama, Madrid (ES); Alberto Lozano Sevilla, Madrid (ES); Daniel Casares Rodríguez, Madrid (ES)

(73) Assignee: Airbus Operations S.L., Getafe, Madrid (ES)

( * ) Notice: Subject to any disclaimer, the term of this patent is extended or adjusted under 35 U.S.C. 154(b) by 421 days.

(21) Appl. No.: 13/033,410

(22) Filed: Feb. 23, 2011

(65) Prior Publication Data

US 2012/0145825 A1 Jun. 14, 2012

(30) Foreign Application Priority Data

Dec. 14, 2010 (ES) .................... 201031838

(51) Int. Cl.
*B64D 45/02* (2006.01)
*F16B 5/04* (2006.01)

(52) U.S. Cl.
CPC .. *B64D 45/02* (2013.01); *F16B 5/04* (2013.01)

(58) Field of Classification Search
CPC ........... B64D 45/02; B64D 2001/0072; B64D 2001/0081
USPC ....................... 244/1 A, 132, 199.4
See application file for complete search history.

(56) References Cited

U.S. PATENT DOCUMENTS

| | | | | |
|---|---|---|---|---|
| 4,352,142 A | * | 9/1982 | Olson ........................ | 361/218 |
| 5,417,385 A | * | 5/1995 | Arnold et al. ................ | 244/1 A |
| 2007/0230085 A1 | * | 10/2007 | Le ................. | 361/212 |
| 2009/0272846 A1 | * | 11/2009 | Anast et al. .................... | 244/120 |

FOREIGN PATENT DOCUMENTS

| | | |
|---|---|---|
| EP | 0976652 A1 | 2/2000 |
| EP | 0976653 A1 | 2/2000 |
| EP | 1484245 A1 | 12/2004 |
| WO | 2006/069996 A1 | 7/2006 |

* cited by examiner

*Primary Examiner* — Brian M O'Hara
(74) *Attorney, Agent, or Firm* — Michael Best & Friedrich LLP

(57) ABSTRACT

A lightning and corrosion protection arrangement for a joint between an outer metallic part (11) and an aircraft structural component (13) completely or partially made of CFRP by means of a row of metallic rivets (15), that comprise inner and outer metallic layers (21, 25) and an intermediate dielectric layer (23), the inner metallic layer (21) in contact with said structural component (13) being thinner and bigger than the outer metallic layer (21) in contact with the metallic part (11), the intermediate dielectric layer (23) extending in an area bigger than the area of the foot (12) of the metallic part (11) by a predetermined minimum linear distance D1 between its edges, the outer metallic layer (25) extending in an area bigger than the area of the intermediate dielectric layer (23) by a predetermined minimum linear distance D2 between its edges.

19 Claims, 1 Drawing Sheet

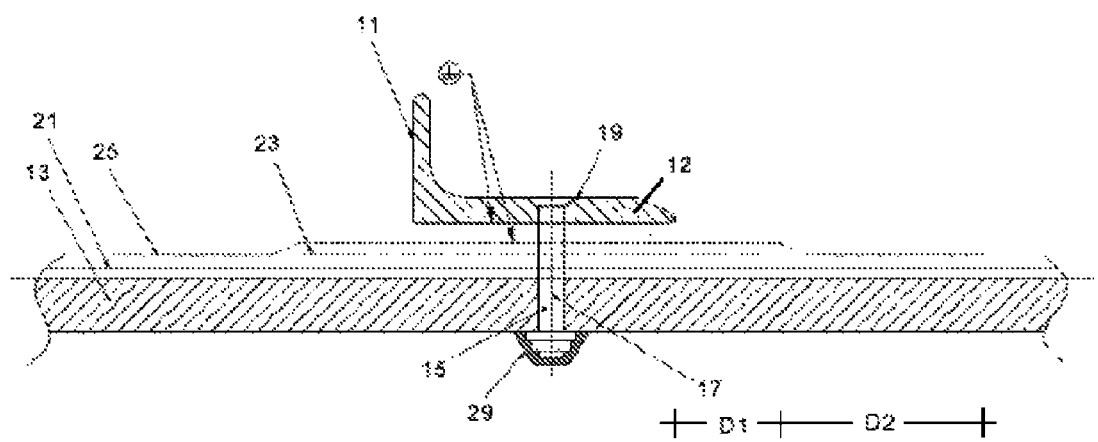

LIGHTNING AND CORROSION PROTECTION ARRANGEMENT IN AN AIRCRAFT STRUCTURAL COMPONENT

FIELD OF THE INVENTION

The invention relates to a lightning and corrosion protection arrangement in an aircraft structural component and, more in particular, to a lightning and corrosion protection arrangement for a metal-to-composite joint.

BACKGROUND OF THE INVENTION

Due to the low conductivity of composites, and particularly carbon fiber, the need to protect them against electrical discharges when they are used in aircraft structures is well known.

A lightning protection is needed in the joint areas of aircrafts components made of composite material, especially CFRP (Carbon Fibre Reinforced Plastic), with another components by means of metallic fasteners and specially needed when the inner component is made of a metallic material as happens in the case of the joint areas of a wing skin with a fuel tank.

Patents or patent applications EP 0976 652, EP 0976 653, EP 1 484 245 and WO 2006/069996 in the name of the applicant disclose lightning protection arrangements in said joint areas.

The current trend in the aeronautic industry to use composite materials instead of metallic materials for aircraft structures with an aerodynamic contour such as lifting surfaces and fuselages has opened new needs of lightning protection arrangements in large aircrafts components made of composite material as happens when a metallic part is joined to an aircraft component by its outer surface. One example of these new needs is the joint area between a metallic drip fence and a CFRP wing skin where phenomena like hot spots or electric arcs generated in lightning events may cause severe damages in the wing skin. In addition in a metallic to CFRP joint is necessary a corrosion protection between the parts.

SUMMARY OF THE INVENTION

There is therefore a demand of new lightning and corrosion protection arrangements for aircraft composite components and the present invention is intended to the attention of this demand.

One object of the present invention is to provide a lightning and corrosion protection arrangement for a metal-to-CFRP joint in an aircraft structural component that allows at the same time the dispersion of the current generated by a lightning strike in the metallic part without damaging the composite component and the protection against the corrosion between the parts.

Another object of the present invention is to provide a lightning and corrosion protection arrangement for a metal-to-CFRP joint in an aircraft structural component that is easy to be implemented in a large composite component.

These and another objects are met by a lightning and corrosion protection arrangement for a joint between an outer metallic part and an aircraft structural component completely or partially made of CFRP by means of a row of metallic rivets, that comprise inner and outer metallic layers and an intermediate dielectric layer, the inner metallic layer in contact with the said structural component being thinner and bigger than the outer metallic layer in contact with the metallic part, the intermediate dielectric layer extending in an area bigger than the area of the foot of the metallic part by a predetermined minimum linear distance D1 between its edges, the outer metallic layer extending in an area bigger than the area of the intermediate dielectric layer by a predetermined minimum linear distance D2 between its edges.

In a preferred embodiment said inner and outer inner metallic layers are expanded copper foil grids and said intermediate dielectric layer is a fiberglass layer. Hereby it is achieved an efficient arrangement for providing at the same time a lightning protection and a corrosion protection to a metal to CFRP joint.

In preferred embodiments when said aircraft structural component is a wing skin and said metallic part is a drip fence, said predetermined minimum distance D1 is 25 mm, said predetermined minimum distance D2 is 50 mm, and the density of the expanded copper foil grid inner and outer layers is comprised, respectively, between 50-100 gr/m2 and 700-900 gr/m2. Hereby it is achieved an efficient lightning and corrosion protection arrangement for a metal to CFRP joint area in an aircraft where both protections are specially needed.

BRIEF DESCRIPTION OF THE DRAWINGS

Other features and advantages of this invention will be understood from the following detailed description of an illustrative embodiment of its object in relation to the attached drawings.

FIG. 1 shows a cross section of the joint area between a metallic part and a composite component with a lightning and corrosion protection arrangement according to this invention.

DETAILED DESCRIPTION OF THE INVENTION

Following FIG. 1 it can be seen a outside joint area between a metallic drip fence 11 with an L-shape and a wing skin 13 made of CFRP using a row of rivets 15 which are installed, with a nut cover 29, following a perpendicular axis 17 to the face of the drip fence 11 with the corresponding countersinking and with a metallic washer 19 interposed between the countersunk part of the rivets 15 and the wing skin 13.

The lightning and corrosion protection arrangement according to the invention comprise inner and outer metallic layers 21, 25 and a dielectric layer 23 embedded between them.

The dielectric layer 23 prevents the corrosion that otherwise will appear in the joint area and therefore shall have an area bigger that the area of the foot 12 of the drip fence 11 in at least a linear distance D1 between its edges.

The outer metallic layer 25 in contact with the foot 12 of the drip fence 11 is a thick metallic layer and overlaps the dielectric layer 23 in at least a linear distance D1 between its edges.

The inner metallic layer 21 in contact with the wing skin 13 is a thin metallic layer and extends along an area around the drip fence 11 suitable dimensioned for the dispersion of the currents.

These layers 21, 23, 25 are incorporated to the wing skin laying up stage so that they can be fully integrated in the wing skin 13 in the curing stage.

This arrangement provides at the same time a suitable path for the dispersion of the lightning currents and the protection against the corrosion. In the area covered by the dielectric layer 23 the current dispersion path is formed only by the outer metallic layer 25, then the path is formed by the overlapping outer and inner metallic layers 21, 25, and, finally, the path is formed only by the inner metallic layer 21.

In a preferred embodiment:

The inner metallic layer 21 is a expanded copper foil grid of a density comprised between 50-100 gr/m2.

The outer metallic layer 25 is a expanded copper foil grid of a density comprised between 700-900 gr/m2.

The dielectric layer 23 is a fiberglass layer.

The minimum linear distance D1 between the edges of the dielectric layer 23 and the edges of the drip fence foot 12 is 25 mm.

The minimum linear distance D2 between the edges of the outer metallic layer 25 and the dielectric layer 23 is 50 mm.

Although the present invention has been fully described in connection with preferred embodiments, it is evident that modifications may be introduced within the scope thereof, not considering this as limited by these embodiments, but by the contents of the following claims.

The invention claimed is:

1. A lightning and corrosion protection system for an aircraft, the system comprising:
   an aircraft structural component comprised of carbon fiber reinforced plastic, wherein the aircraft structural component defines an outer surface of the aircraft, and wherein the aircraft structural component includes an opening therethrough;
   a metallic part extending substantially parallel to the aircraft structural component;
   a metallic rivet coupling the metallic part to the aircraft structural component, wherein the metallic rivet is inserted through the opening;
   an inner metallic layer coupled to the outer surface of the aircraft structural component;
   an outer metallic layer having one side coupled to a surface of the metallic part and having an opposite side sealed directly to the inner metallic layer; and
   a dielectric layer interposed between the inner and outer metallic layers, wherein the inner metallic layer extends in an area greater than the outer metallic layer, the dielectric layer extends in an area greater than the metallic part and wherein the outer metallic layer extends in an area greater than the dielectric layer.

2. A system as set forth in claim 1, wherein the inner metallic layer is thinner than the outer metallic layer.

3. A system as set forth in claim 1, wherein the metallic part defines a metallic part edge, the dielectric layer defines a dielectric layer edge, and the dielectric layer edge is offset relative to the metallic part edge by a predetermined distance D1.

4. A system as set forth in claim 3, wherein the predetermined distance D1 is about 25 mm.

5. A system as set forth in claim 1, wherein the outer metallic layer defines an outer metallic layer edge, the dielectric layer defines a dielectric layer edge, and the outer metallic layer edge is offset relative to the dielectric layer edge by a predetermined distance D2.

6. A system as set forth in claim 5, wherein the predetermined distance D2 is about 50 mm.

7. A system as set forth in claim 1, wherein the inner and outer metallic layers each include expanded copper foil grids.

8. A system as set forth in claim 1, wherein the inner metallic layer is associated with a density of 50 gr/m2 to 100 gr/m2 and the outer metallic layer is associated with a density of 700 gr/m2 to 900 gr/m2.

9. A system as set forth in claim 1, wherein the dielectric layer includes fiberglass.

10. A system as set forth in claim 1, wherein the aircraft structural component includes an aircraft wing skin.

11. A system as set forth in claim 1, wherein the metallic part includes a drip fence.

12. A lightning and corrosion protection arrangement for applying between an aircraft wing skin and a metallic drip fence, the arrangement comprising:
   an inner metallic layer coupled to an outer surface of the aircraft wing skin;
   an outer metallic layer coupled to a surface of the metallic drip fence, wherein the outer metallic layer is sealed directly to the inner metallic layer; and
   a dielectric layer embedded between the inner and outer metallic layers, wherein the inner and outer metallic layers and the dielectric layers each include an opening therethrough, and wherein the openings accommodate a rivet connecting the aircraft wing skin and the metallic drip fence.

13. An arrangement as set forth in claim 12, wherein the inner metallic layer is thinner than the outer metallic layer.

14. An arrangement as set forth in claim 12, wherein the inner metallic layer defines an inner surface area, the outer metallic layer defines an outer surface area, and the inner surface area is greater than the outer surface area.

15. An arrangement as set forth in claim 12, wherein the outer metallic layer defines an outer metallic layer edge, the dielectric layer defines a dielectric layer edge, and the outer metallic layer edge is offset relative to the dielectric layer edge by a predetermined distance D2.

16. An arrangement as set forth in claim 15, wherein the predetermined distance D2 is about 50 mm.

17. An arrangement as set forth in claim 12, wherein the inner and outer metallic layers each include expanded copper foil grids.

18. An arrangement as set forth in claim 12, wherein the inner metallic layer is associated with a density of 50 gr/m2 to 100 gr/m2 and the outer metallic layer is associated with a density of 700 gr/m2 to 900 gr/m2.

19. An arrangement as set forth in claim 12, wherein the dielectric layer includes fiberglass.

* * * * *